June 8, 1965 K. H. MARLOW ETAL 3,187,589

CHANNEL SELECTORS FOR TELEVISION RECEIVERS

Filed May 1, 1961

2 Sheets-Sheet 1

INVENTORS
Keith Henry Marlow &
James Harry Want
BY Norman J. O'Malley
ATTORNEY

CHANNEL SELECTORS FOR TELEVISION RECEIVERS

Filed May 1, 1961 2 Sheets-Sheet 2

INVENTOR
Keith Henry Marlow &
James Harry Want
BY
Norman J. O'Malley
ATTORNEY 3,187,589
CHANNEL SELECTORS FOR TELEVISION RECEIVERS Keith Henry Marlow and James Harry Want, London, England, assignors to Ferguson Radio Corporation Limited, London, England, a British company
Filed May 1, 1961, Ser. No. 106,723
13 Claims. (Cl. 74—10.7)

The invention relates to channel selectors for television receivers, and is concerned more particularly with selectors incorporating a turret tuner having an angularly movable member adjustable into a plurality of setting positions, each of which selects a different frequency channel.

Turret tuners are usually provided with spring-loaded indexing or dish stop mechanisms for locating the angularly adjustable member in any preselected setting position, and the springs of such indexing mechanisms must be relatively strong to ensure accurate location of the tuner member. Considerable torque must therefore be applied to the tuner member to overcome the spring force of the indexing mechanisms during channel selection. Such tuners have previously been provided with a selector handle or knob secured directly on the angularly movable member, but these selector handles or knobs must be relatively large to enable an operator to provide sufficient torque by hand to overcome the indexing mechanism.

The object of the invention is to provide an improved channel selector which permits easy selection of any desired channel.

According to the invention there is provided a channel selector for television receivers comprising a frequency tuner having an angularly movable member adjustable into a plurality of frequency setting positions, a spring-loaded indexing mechanism firmly locating the tuner member in any selected one of said setting positions, release means for removing or reducing the spring-loading of the indexing mechanism on the tuner member to permit angular movement of the tuner member under the action of a relatively small torque, and a control element movable along a scale and coupled to the tuner member by cable drive means arranged, upon operation of the release means, to effect angular movement of the tuner member into any selected one of its setting positions in response to movement of the control element along the scale.

The indexing mechanism preferably includes a spring toggle coupled to a locating element movable into and out of engagement with a cam track on the angularly movable tuner member, the spring toggle being movable through a dead centre position upon movement of the locating element out of engagement with the cam track, whereby the toggle spring biases the locating element towards the cam track when in the engaged position and biases the locating element away from the cam track when in the disengaged position. The control element can conveniently be slidably mounted on a release bar coupled to the spring toggle and pivotally mounted on the frame of the selector, the spring toggle being moved through its dead centre position upon pivotal movement of the release bar.

Figures 1, 2:
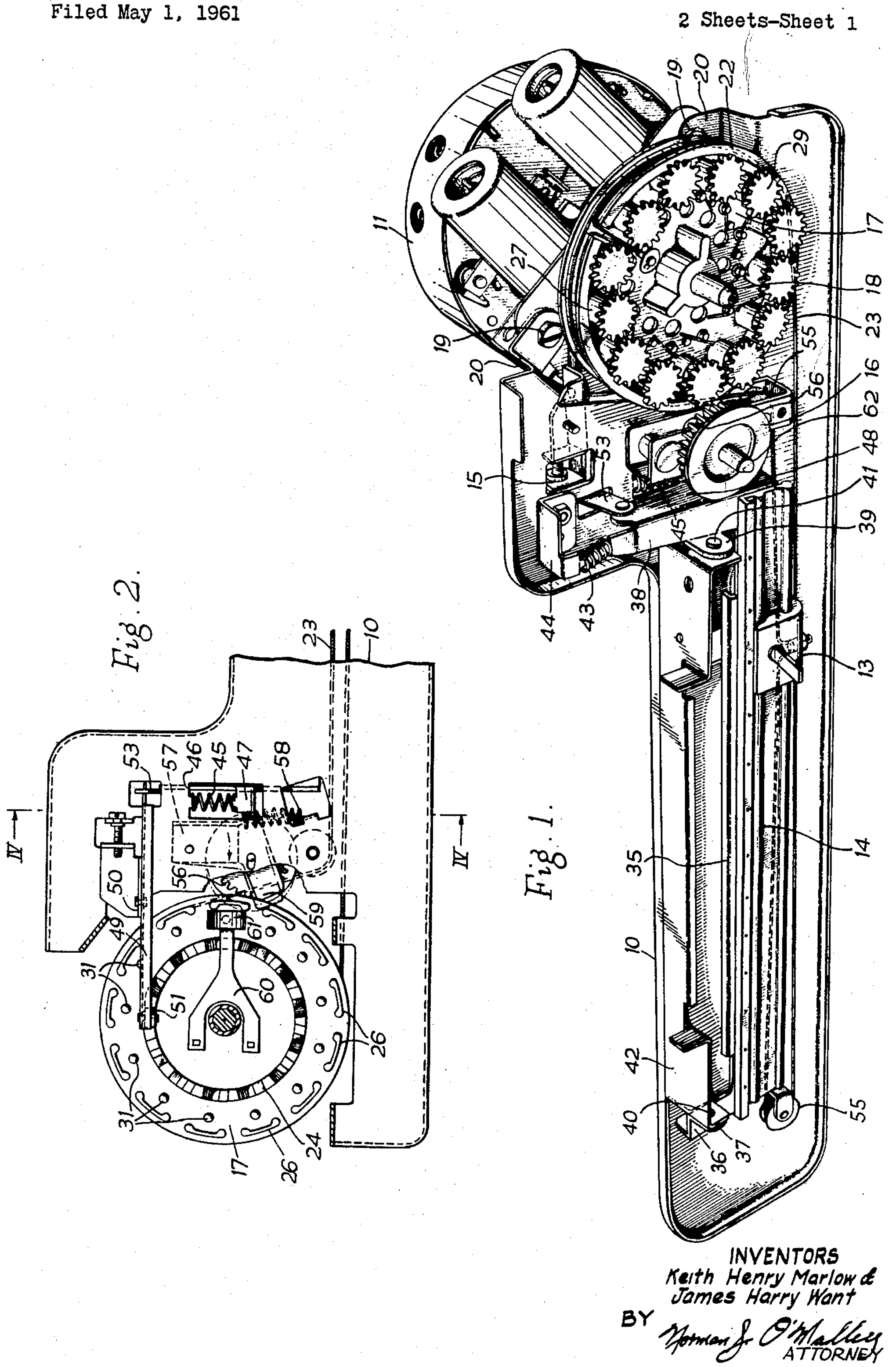
Figure 3:
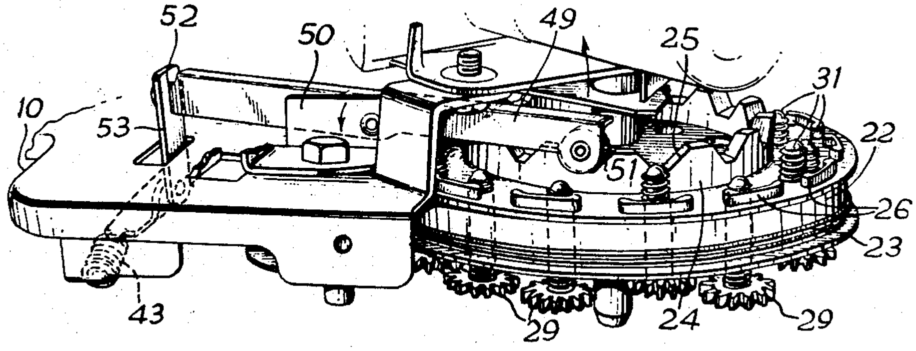
Figures 4, 5:
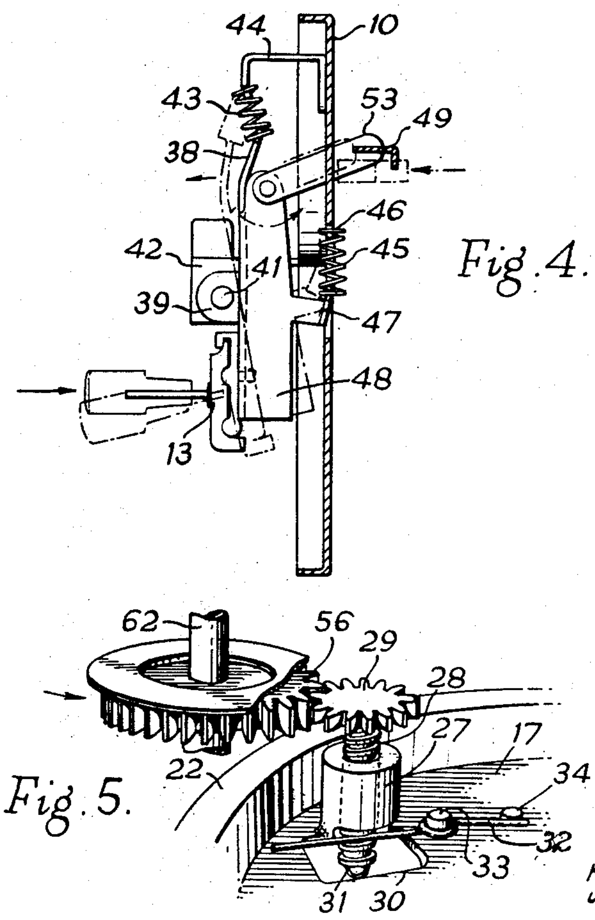

A channel selector according to the invention will now be described by way of example with reference to the accompanying drawings, in which:

FIG. 1 is a perspective view of the channel selector taken from the front,

FIG. 2 is a rear view of one end of the selector, portions of the back plate and the tuner being cut away to show details of the indexing mechanism and fine tuning components, FIG. 3 is a perspective view taken from the rear of the end of the selector shown in FIG. 2, FIG. 4 is a view taken along the line IV—IV of FIG. 2, showing details of the spring toggle of the indexing mechanism, and FIG. 5 is a perspective view showing details of a fine tuning element and the fine tuning coupling member.

Referring to the drawings, the channel selector comprises a back plate 10, a tuner unit 11 mounted on the right hand side of the back plate (as viewed in FIG. 1) a channel control member 13 slidably mounted on a scale bar 14 extending along the left hand portion of the back plate and a spring-loaded indexing mechanism 15 and a fine tuning control 16 mounted on the back plate between the scale bar 14 and the tuner unit 11.

The back plate 10 is formed of sheet metal, for example aluminum, the outer edges of the back plate being turned inwardly to provide additional strength, and the upper right hand portion of the back plate is cut away for the reception of the tuner unit 11. The tuner unit 11 is of standard construction comprising a housing and a rotary member angularly movable into thirteen frequency settings, and a tuner disc 17 is rigidly secured to the shaft 18 of the rotary member. The housing of the tuner unit 11 is secured by bolts 19 to three rearwardly cranked lugs 20, on the back plate (only two of the lugs 20 being shown in FIG. 1) the housing being positioned to the rear of the back plate and the tuner disc 17 positioned to the front of the back plate.

The outer edge of the tuner disc 17 is provided with a forwardly projecting flange forming a drive drum 22, the outer surface of the drum being recessed to form a track for a driving cable 23, and the rear of the disc 17 is provided with an indexing cam ring 24 having thirteen notches 25 spaced around the rear edge of the ring 24. The rear of the disc 17 is also provided with thirteen cam projections 26 spaced annularly around the cam ring 24, each cam projection 26 being radially in line with a different notch 25. The front of the tuner disc 17 is provided with thirteen sleeves 27 spaced symmetrically around the disc, and each sleeve 27 has a fine tuning screw 28 passing therethrough. The front end of each screw 28 is provided with a gear wheel 29 and the rear end of each screw 28 projects through an aperture 30 in the disc 17, the rear ends of the screws forming cam pins 31 for a purpose to be described hereinafter. Each tuning screw 28 is located within its sleeve 27 by an individual wire spring 32 looped around a peg 33, one end of the wire spring projecting into a cut-away portion of the associated sleeve 27 and engaging in the thread of the screw 28 and the other end of the wire spring engaging against an abutment 34 on the tuner disc 17.

The scale bar 14 is secured to the front surface of a release bar 35 provided, at its left hand end, with an upwardly projecting lever 36 having a lug 37, and at its right hand end, with an upwardly projecting lever 38 having a lug 39. The two lugs 37, 39 are connected by aligned pivot pins 40, 41 to a bracket 42 secured to the upper edge of the back plate, so that release bar 35, together with the levers 36, 38 are pivotally mounted about a common axis passing through the pivot pins 40, 41.

A coil spring 43 is compressed between the upper end of the lever 38 and a bracket 44 secured to the back plate, the spring being held in position by lugs on the lever 38 and bracket 44 engaging within the coils of the spring. The lever 38 and spring 43 form a spring toggle, the arrangement being such that upon pivotal movement of the release bar, the spring toggle passes through a dead centre position in which the lever 38 is aligned with the spring 43. A main coil spring 45 is located in an aperture 46 in the back plate and is compressed between the edge of the aperture 46 and an arm 47 on a forwardly projecting flange 48 on the lever 38, the spring 45 being located in position by lugs on the back plate and arm 47 engaging within the coils of the spring. The coil spring 45 is arranged to exert on the lever 38 a greater torque than that exerted on the lever by the spring 43, so that the release bar is biased into its forward position when the spring toggle is urging the release bar towards its rear position.

The indexing mechanism for the tuner units comprises a lever 49 pivotally connected intermediate its ends to a bracket 50 secured on the rear of the back plate. One end of the lever 49 projects behind the tuner disc 17 and carries a roller 51 arranged to roll on the rear edge of the cam ring 24, and the other end of the lever 49 engages within a slot 52 in the rear end of a link 53 which extends through an aperture in the back plate and is pivotally connected at its forward end to the flange 48 on the lever 38.

The lever 49 is coupled to the release bar 35 by the link 53 and lever 38, and forward and rearward movement of the release bar about its pivot axis effects movement of the roller 51 towards and away from the edge of the cam ring 24 respectively. The spring 45 thus yieldably urges the roller 51 against the edge of the cam ring, and when the roller is engaged in a notch 25, the action of the spring 45 is reinforced by that of the toggle spring 43, so that the tuner disc is firmly located against angular movement. The roller 51 is disengaged from the cam ring 24 by rearward pivotal movement of the release bar against the action of the two springs 43, 45. Such rearward pivotal movement however moves the spring toggle 43, 38 through its dead centre position, and in the rear position of the release bar the toggle spring 43 opposes the action of the spring 45 so that only a light pressure is needed to hold the release bar in its rear position.

The tuner disc 17 is drivably connected to the control member 13 by the cable 23 which extends around the drum 22 and is guided along the length of the scale bar 14 by pulleys 55 mounted on brackets on the back plate. The cable is rigidly secured to the control member 13 and the ends of the cable are anchored on the drum.

Since the scale bar 14 is mounted on the release bar, any desired channel may readily be selected by depressing the control member 13 to pivot the release bar into its rear position and then moving the control member 13 along the scale bar to the desired frequency setting, the tuner disc being moved angularly by the cable in response to linear movement of the control member. Upon initially depressing the control member, sufficient hand pressure must be applied in order to overcome the restoring force of the two springs 43, 45, but only a small hand pressure is required to maintain the control lever in the depressed position since the force of the spring 43 acts against the restoring force of the spring 45.

The fine tuning control comprises a gear wheel 56 rotatably mounted on the lower end of a lever 57 pivotally mounted at its upper end to the back plate. The lever 57 is of channel section, one flange being in sliding engagement with the back plate and the other flange supporting the gear wheel 56. The lower end of the web of the lever 57 is extended to provide a lug engaged in a coil spring 58 compressed between the lower end of the lever 57 and an abutment on the back plate, and the lower end of the rear flange of the lever 57 is formed with a detent 59 projecting towards the tuner disc.

The lever 57 and spring 58 form a spring toggle and the fine tuning control is so arranged that the gear wheel 56 is movable into and out of meshing engagement with the gear wheel 29 of an adjacent tuning element on the tuner disc upon pivotal movement of the lever, and that the lever 57 and spring 58 pass through a dead centre position upon movement of the gear wheel 56 into and out of meshing engagement with the gear wheel 29. The spring 58 thus biases the gear wheel 56 towards the gear wheel 29 when the two gear wheels are in mesh, and biases the gear wheel 56 away from the gear wheel 29 when the two gear wheels are out of mesh. The detent 59 is arranged so that it projects between two adjacent cam projections 26 on the tuner disc when the tuner unit is located in one of its setting positions and the lever 57 is in its engaged position with the gear wheel 56 meshing with the gear wheel 29.

A fine tuning lever 60 is pivotally mounted at one end on the housing of the tuner unit and the free end of the lever 60 is provided with a cam follower 61 arranged to engage a different one of the cam pins 31 on the tuner disc at each setting of the disc. The lever 60 is biased by a spring (not shown) against the cam pins 31, and a tuning device in the housing of the tuner unit is connected to the lever 60, the tuning device being adjustable in accordance with the angular setting of the lever 60.

To obtain fine tuning at any selected setting of the tuner disc, the lever 57 is pivoted into its engaged position, by hand pressure on a handle 62 on the gear wheel 56, to move the gear wheel 56 into mesh with the adjacent gear wheel 29. The spring 58 holds the lever 57 in the engaged position and the axial setting of the cam pins 31 on the screws 28, and hence the setting of the lever 60 and the tuning device, may be adjusted by rotation of the handle 62.

When the tuner disc is rotated to select another frequency channel, the cam projections 26 on the disc engage the detent 59 on the lever 57 and throw the lever 57 into its disengaged position with the gear wheel 56 out of meshing engagement with the gear wheel 29. The toggle spring 58 then holds the lever 57 in its disengaged position.

For a better understanding of the invention, the sequence of operation will be described. When it is desired to change channels on the television receiver, the operator grasps channel control member 13 and depresses it downwardly. This action causes scale bar 14 and attached release bar 35 to pivot rearwardly about pivot pins 40, 41. As lever 38 is attached to release bar 35, it, too, is caused to move thereby overthrowing spring 43 which is attached to its upper end. Spring 43 is now acting against main spring 45 so that only a small amount of pressure is needed to maintain channel control member 13 in its depressed position. Simultaneously, roller 51 on lever 49 is disengaged from cam ring 24 because lever 49 is connected to lever 38 through link 53 and flange 48. With roller 51 disengaged, sliding movement of control member 13 and, through cable 23, angular movement of tuner member 17 is possible. Linear movement of control member 13 is now effected to the new channel position desired and then member 13 is released. With operator pressure removed, main spring 45 is now free to act against flange 48 thereby urging attached lever 38 back into its normal posiiton. As lever 38 (and attached scale bar 14 and release bar 35), is pivoting about pin 41, spring 43 begins to add its pressure to spring 45. Again, simultaneously with this action lever 49 is driven to pivot about its pivot point by link 53 which is attached to flange 48 thereby depositing roller 51 into the proper notch 25 of cam ring 24. When this action is completed, both spring 43 and main spring 45 are acting together to maintain roller 51 in the notch.

If it is now necessary to fine tune the television receiver, the operator grasps handle 62 of gear wheel 56 and, by hand pressure, pivots it into engagement with the adjacent one of gear wheels 29 on tuner member 17. This causes the spring toggle formed from lever 57 and spring 58 to pass through dead centre and thus bias gear wheel 56 against gear wheel 29. Gear wheel 56 will maintain this engagement until the channel is changed. It will be seen from FIG. 2 that when gear wheel 56 is engaged with gear wheel 29, detent 59 on lever 57 lies between two cam projections 26 on tuner member 17. Therefore, when the channel is again changed, angular movement of tuner member 17 causes cam projection 26 to force detent 59 outwardly beyond the center of the spring toggle, which then acts to keep gear wheel 56 separated from gear wheels 29 until such time as the operator again engages them.

We claim:

1. A channel selector for television receivers comprising a frequency tuner having an angularly movable tuner member adjustable into a plurality of frequency setting positions, a spring-loaded indexing mechanism firmly locating said tuner member in any selected one of said setting positions, said spring-loaded indexing mechanism being under sufficient tension so that a given torque is required to angularly move said tuner member, release means operatively connected to said indexing mechanism and including a bar pivoted to said selector for at least reducing said spring loading of said indexing mechanism on said tuner member to permit angular movement of said tuner member under the action of a torque substantially less than said given torque, a control element movable along said bar and cable drive means coupling said control element to said tuner member and arranged, upon movement of the control element to pivot the bar and thereby to effect operation of the release means, further to effect angular movement of the tuner member into any selected one of its setting positions in response to movement of said control element along said scale.

2. A channel selector for television receivers comprising a frequency tuner having an angularly movable tuner member adjustable into a plurality of frequency setting positions, a spring-loaded indexing mechanism firmly locating said tuner member in any selected one of said setting positions and comprising a locating element movable into and out of engagement with said tuner member and a spring toggle coupled to said locating element and movable through a dead centre position upon movement of said locating element into and out of engagement with said tuner member, said spring-loaded indexing mechanism being under sufficient tension so that a given torque is required to angularly move said tuner member, release means operatively coupled to said indexing mechanism for at least reducing said spring-loading of said indexing mechanism on said tuner member to permit angular movement of said tuner member under the action of a torque substantially less than said given torque, a control element coupled to the release means and movable along a scale and cable drive means coupling said control element to said tuner member and arranged, upon operation of the release means, to effect angular movement of said tuner member into any selected one of its setting positions in response to movement of said control element along said scale.

3. A channel selector for television receivers comprising a frequency tuner having an angularly movable tuner member adjustable into a plurality of frequency setting positions, a spring-loaded indexing mechanism firmly locating said tuner member in any selected one of said setting positions and comprising a main spring, a locating element movable into and out of engagement with said tuner member and a spring toggle coupled to said locating element and movable through a dead centre position upon movement of said locating element into and out of engagement with said tuner member, said main spring yieldably urging said locating element into engagement with said tuner member with a force exceeding that exerted on said locating element by said spring toggle, said spring-loaded indexing mechanism being under sufficient tension so that a given torque is required to angularly move said tuner member, release means operatively coupled to said indexing mechanism for at least reducing said spring-loading of said indexing mechanism on said tuner member to permit angular movement of said tuner member under the action of a torque substantially less than said given torque, a control element coupled to the release means and movable along a scale and cable drive means coupling said control element to said tuner member and arranged, upon operation of the release means, to effect angular movement of the tuner member into any selected one of its setting positions in response to movement of said control element along said scale.

4. A channel selector for television receivers comprising a frequency tuner having an angularly movable tuner member adjustable into a plurality of frequency setting positions, a spring-loaded indexing mechanism firmly locating said tuner member in any selected one of said setting positions and comprising a locating element movable into and out of engagement with said tuner member and a spring toggle coupled to said locating element and movable through a dead centre position upon movement of said locating element into and out of engagement with said tuner member, said spring-loaded indexing mechanism being under sufficient tension so that a given torque is required to angularly move said tuner member, release means for at least reducing said spring-loading of said indexing mechanism on said tuner member to permit angular movement of said tuner member under the action of a torque substantially less than said given torque, said release means being coupled to said spring toggle and operative to move said spring toggle through its dead centre position, a control element coupled to said release means and movable along a scale and cable drive means coupling said control element to said tuner member and arranged, upon operation of the release means, to effect angular movement of said tuner member into any selected one of its setting positions in response to movement of said control element along said scale.

5. A channel selector for television receivers comprising a frequency tuner having an angularly movable tuner member adjustable into a plurality of frequency setting positions, a spring-loaded indexing mechanism firmly locating said tuner member in any selected one of said setting positions, said spring-loaded indexing mechanism being under sufficient tension so that a given torque is required to angularly move said tuner member, and comprising a locating element movable into and out of engagement with said tuner member, a main spring yieldably urging said locating element into its engaged position, and a spring toggle comprising a toggle spring and a toggle arm coupled to said locating element and pivotally mounted to the frame of said selector, said spring toggle being movable through a dead centre position upon movement of said locating element into and out of engagement with said tuner member, whereby said toggle spring assists the action of said main spring when said locating element is in its engaged position and opposes the action of said main spring when said locating element is in its fully disengaged position, release means operatively coupled to said indexing mechanism for at least reducing said spring-loading of said indexing mechanism on said tuner member to permit angular movement of said tuner member under the action of a torque substantially less than said given torque, a control element coupled to the release means and movable along a scale and cable drive means coupling said control element to said tuner member and arranged, upon operation of the release means, to effect angular movement of the tuner member into any selected one of its setting positions in response to movement of said control element along said scale.

6. A channel selector for television receivers comprising a frequency tuner having an angularly movable tuner member adjustable into a plurality of frequency setting positions, a spring-loaded indexing mechanism firmly locating said tuner member in any selected one of said setting positions and comprising a locating element movable into and out of engagement with said tuner member and a spring toggle coupled to said locating element and movable through a dead centre position upon movement of said locating element into and out of engagement with said tuner member, said spring-loaded indexing mechanism being under sufficient tension so that a given torque is required to angularly move said tuner member, release means operatively coupled to said indexing mechanism for at least reducing said spring-loading of said indexing mechanism on said tuner member to permit angular movement of said tuner member under the action of a torque substantially less than said given torque, said release means comprising a release bar mounted on the frame of said selector for pivoted movement about an axis parallel to the axis of said bar and a control element slidably mounted on said bar for movement along a linear scale; and cable drive means coupling said control element to said tuner member and arranged, upon operation of the release means, to effect angular movement of said tuner member into any selected one of its setting positions in response to movement of said control element along said scale.

7. A channel selector for television receivers comprising a frequency tuner having an angularly movable tuner member adjustable into a plurality of frequency setting positions, a spring-loaded indexing mechanism firmly locating said tuner member in any selected one of said setting positions, said spring-loaded indexing mechanism being under sufficient tension so that a given torque is required to angularly move said tuner member, release means for at least reducing said spring loading of said indexing mechanism on said tuner member to permit angular movement of said tuner member under the action of a torque substantially less than said given torque; said indexing mechanism including a locating element movable into and out of engagement with the angularly movable tuner member and a spring toggle coupled to the locating element and movable through a dead centre position upon movement of the locating element into and out of engagement with the tuner member; said release means comprising a release bar mounted on the frame of the selector for pivotal movement about an axis parallel to the axis of the bar and a control element slidably mounted on the release bar for movement along a linear scale; said control element having a cable drive means coupling said control element to said tuner member and arranged, upon operation of the release means, to affect angular movement of the tuner member into any selected one of its setting positions in response to movement of the control element along said linear scale; said spring toggle comprising a lever constituting the toggle arm of said spring toggle, and said release bar being rigidly secured to said lever and said toggle arm being movable through a dead centre position relative to the toggle spring upon pivotal movement of said release bar.

8. A channel selector for television receivers comprising a frequency tuner having an angularly movable tuner member adjustable into a plurality of frequency setting positions, a spring-loaded indexing mechanism firmly locating said tuner member in any selected one of said setting positions, said spring-loaded indexing mechanism being under sufficient tension so that a given torque is required to angularly move said tuner member, release means operatively coupled to said indexing mechanism for at least reducing said spring loading of said indexing mechanism on said tuner member to permit angular movement of said tuner member under the action of a torque substantially less than said given torque; said indexing mechanism including a locating element movable into and out of engagement with the angularly movable tuner member and a spring toggle coupled to the locating element and movable through a dead centre position upon movement of the locating element into and out of engagement with the tuner member; said locating element of the indexing mechanism comprising a lever pivotally mounted to the frame of the selector and carrying a roller for engagement with an angular cam track on the angularly movable tuner member, said release means comprising a release bar mounted on the frame of the selector for pivotal movement about an axis parallel to the axis of the bar and a control element slidably mounted on the release bar for movement along a linear scale; said control element having a cable drive means coupling said control element to said tuner member and arranged, upon operation of the release means, to effect angular movement of the tuner member into any selected one of its setting positions in response to movement of the control element along said linear scale; said spring toggle comprising a lever constituting a toggle arm of said spring toggle, and said release bar being rigidly secured to said lever and said toggle arm being movable through a dead centre position relative to the toggle spring upon pivotal movement of said release bar, said lever of the locating element being coupled to the toggle arm and the arrangement being such that pivotal movement of the release bar into an operative position effects pivotal movement of the locating element into a position wherein the roller is disengaged from the cam track.

9. A channel selector for television receivers comprising a frequency tuner having an angularly movable tuner member adjustable into a plurality of frequency setting positions, a spring-loaded indexing mechanism firmly locating said tuner member in any selected one of said setting positions and comprising a locating element movable into and out of engagement with said tuner member and a spring toggle coupled to said locating element and movable through a dead centre position upon movement of said locating element into and out of engagement with said tuner member, said spring-loaded indexing mechanism being under sufficient tension so that a given torque is required to angularly move said tuner member, release means for at least reducing said spring-loading of said indexing mechanism on said tuner member to permit angular movement of said tuner member under the action of a torque substantially less than said given torque, said release means being operatively coupled to said indexing mechanism and comprising a release bar mounted on the frame of said selector for pivotal movement about an axis parallel to the axis of said bar and a control element slidably mounted on said bar for movement along a linear scale; and cable drive means coupling said control element to said tuner member and arranged, upon operation of the release means, to effect angular movement of said tuner member into any selected one of its setting positions in response to movement of said control element along said scale; said tuner member being provided with a drive drum and said cable drive means comprising a cable guided around an endless track extending around the periphery of said drum and along the length of said release bar, said control element being rigidly secured to said cable.

10. A channel selector for television receivers comprising a frequency tuner having an angularly movable tuner member adjustable into a plurality of frequency setting positions, said tuner member having adjustable fine tuning elements mounted thereon each operable to adjust the tuning at a separate one of said frequency settings of said tuner member; a fine tuning control for adjusting said fine tuning elements comprising a coupling member movable into and out of engagement with the associated tuning element of each of the frequency settings, a spring toggle connected to said coupling member and movable through a dead centre position upon movement of said coupling member into and out of engagement with a fine tuning element, and disengaging means for moving said coupling member out of engagement with a tuning element upon angular movement of said tuner member; a spring-loaded indexing mechanism firmly locating said tuner member in any selected one of said setting positions, said spring-loaded indexing mechanism being under sufficient tension so that a given torque is required to angularly move said tuner member, release means operatively coupled to said indexing mechanism for at least reducing said spring-loading of said indexing mechanism on said tuner member to permit angular movement of said tuner member under the action of a torque substantially less than said given torque, a control element coupled to the release means and movable along a scale and cable drive means coupling said control element to said tuner member and arranged, upon operation of the release means, to effect angular movement of the tuner member into any selected one of its setting positions in response to movement of said control element along said scale.

11. A channel selector for television receivers comprising a frequency tuner having an angularly movable tuner member adjustable into a plurality of frequency setting positions, said tuner having adjustable fine tuning elements mounted thereon each operable to adjust the tuning at a separate one of said frequency settings of said tuner member; a fine tuning control for adjusting said fine tuning elements comprising a coupling member movable into and out of engagement with the associated tuning elements of each of the frequency settings, a spring toggle connected to said coupling member and movable through a dead centre position upon movement of said coupling member into and out of engagement with a fine tuning element, said spring toggle comprising a toggle arm pivotally mounted on the frame of said selector and a toggle spring compressed between said arm and said frame, said spring toggle being movable through a dead centre position in which said toggle spring and said arm are in alignment, said coupling member being rotatably mounted on said toggle arm; disengaging means for moving said coupling member out of engagement with a tuning element upon angular movement of said tuner member; a spring-loaded indexing mechanism firmly locating said tuner member in any selected one of said setting positions, said spring-loaded indexing mechanism being under sufficient tension so that a given torque is required to angularly move said tuner member, release means operatively coupled to said indexing mechanism for at least reducing said spring-loading of said indexing mechanism on said tuner member to permit angular movement of said tuner member under the action of a torque substantially less than said given torque, a control element coupled to the release means and movable along a scale and cable drive means coupling said control element to said tuner member and arranged, upon operation of the release means, to effect angular movement of the tuner member into any selected one of its setting positions in response to movement of said control element along said scale.

12. A channel selector for television receivers comprising a frequency tuner having an angularly movable tuner member adjustable into a plurality of frequency setting positions, said tuner member having adjustable fine tuning elements mounted thereon each operable to adjust the tuning at a separate one of said frequency settings of said tuner member; a fine tuning control for adjusting said fine tuning elements comprising a coupling member movable into and out of engagement with the associated tuning elements at each of the frequency settings, a spring toggle connected to said coupling member and movable through a dead centre position upon movement of said coupling member into and out of engagement with a fine tuning element, said spring toggle comprising a toggle arm pivotally mounted on the frame of said selector and a toggle spring compressed between said arm and said frame, and disengaging means for moving said coupling member out of engagement with a tuning element upon angular movement of said tuner member, said disengaging means comprising a plurality of cams mounted on said tuner mmeber and arranged to engage a cam follower on said toggle arm when said coupling member is engaged with a fine tuning element, the arrangement being such that, upon angular movement of said tuner member, the cam follower rides up an adjacent cam and swivels the toggle arm through its dead centre position, the toggle spring then biasing the toggle arm into a position in which the cam follower and the coupling member are fully disengaged from the cams and fine tuning elements respectively; a spring-loaded indexing mechanism firmly locating said tuner mmeber in any selected one of said setting positions, said spring-loaded indexing mechanism being under sufficient tension so that a given torque is required to angularly move said tuner member, release means operatively coupled to said indexing mechanism for at least reducing said spring-loading of said indexing mechanism on said tuner member to permit angular movement of said tuner member under the action of a torque substantially less than said given torque, a control element coupled to the release means and movable along a scale and cable drive means coupling said control element to said tuner member and arranged, upon operation of the release means, to effect angular movement of the tuner member into any selected one of its setting positions in response to movement of said control element along said scale.

13. A channel selector for television receivers comprising a frequency tuner having an angularly movable tuner member adjustable into a plurality of frequency setting positions, said tuner member having adjustable fine tuning elements mounted thereon each operable to adjust the tuning at a separate one of said frequency settings of said tuner member; a fine tuning control for adjusting said fine tuning elements comprising a coupling member movable into and out of engagement with the associated tuning elements of each of the frequency settings, said coupling member comprising a gear wheel and each of said fine tuning elements comprising a screw mounted on said tuner member and a gear wheel secured for rotation therewith and engageable with said coupling member gear wheel, said screw being adjustable axially of said tuner member upon rotation of said screw, and one end of the screw forming a cam for engagement with a follower coupled to a fine tuning device; a spring toggle connected to said coupling member and movable through a dead centre position upon movement of said coupling member into and out of engagement with a fine tuning element, and disengaging means for moving said coupling member out of engagement with a tuning element upon angular movement of said tuner member; a spring-loaded indexing mechanism firmly locating said tuner member in any selected one of said setting positions, said spring-loaded indexing mechanism being under sufficient tension so that a given torque is required to angularly move said tuner member, release means operatively coupled to said indexing mechanism for at least reducing said spring-loading of said indexing mechanism on said tuner member to permit angular movement of said tuner member under the action of a torque substantially less than said given torque, a control element coupled to the release means and movable along a scale and cable drive means coupling said control element to said tuner member and arranged, upon operation of the release means, to effect angular movement of the tuner member into any selected one of its setting positions in response to movement of said control element along said scale.

References Cited by the Examiner

UNITED STATES PATENTS

| | | | |
|---|---|---|---|
| 2,343,219 | 2/44 | Marholz | 334—7 |
| 2,521,968 | 9/50 | De Tar et al. | 74—10 X |
| 2,735,330 | 2/56 | Polster | 74—10.15 X |
| 2,803,139 | 8/57 | Wright | 74—10.7 |
| 2,836,082 | 5/58 | Miner | 74—10.7 |
| 2,905,021 | 9/59 | Kuykendall | 336—137 |
| 2,947,866 | 8/60 | Valdettaro et al. | 74—10.27 |
| 3,022,674 | 2/62 | Cross et al. | 74—10.6 X |
| 3,058,075 | 10/62 | Polley. | |

BROUGHTON G. DURHAM, *Primary Examiner.*

UNITED STATES PATENT OFFICE
CERTIFICATE OF CORRECTION

Patent No. 3,187,589 June 8, 1965

Keith Henry Marlow et al.

It is hereby certified that error appears in the above numbered patent requiring correction and that the said Letters Patent should read as corrected below.

Column 3, line 5, for "units" read -- unit --; column 9, lines 57 and 67, for "mmeber", each occurrence, read -- member --.

Signed and sealed this 21st day of December 1965.

(SEAL)
Attest:

ERNEST W. SWIDER
Attesting Officer

EDWARD J. BRENNER
Commissioner of Patents